(12) United States Patent
Lee et al.

(10) Patent No.: US 9,166,654 B2
(45) Date of Patent: Oct. 20, 2015

(54) WIRELESS POWER TRANSMISSION AND COMMUNICATION BETWEEN DEVICES

(75) Inventors: Jaesung Lee, Gyeonggi-Do (KR); Inchang Chu, Seoul (KR)

(73) Assignee: LG Electronics Inc., Seoul (KR)

( * ) Notice: Subject to any disclaimer, the term of this patent is extended or adjusted under 35 U.S.C. 154(b) by 272 days.

(21) Appl. No.: 13/538,622

(22) Filed: Jun. 29, 2012

(65) Prior Publication Data

US 2013/0005252 A1 Jan. 3, 2013

(30) Foreign Application Priority Data

Jun. 29, 2011 (KR) .......................... 10-2011-0064029

(51) Int. Cl.
*H04B 5/00* (2006.01)
*H02J 7/02* (2006.01)
*H02J 17/00* (2006.01)

(52) U.S. Cl.
CPC .............. *H04B 5/0037* (2013.01); *H02J 7/025* (2013.01); *H02J 17/00* (2013.01); *H04B 5/0093* (2013.01); *Y10T 307/305* (2015.04)

(58) Field of Classification Search
USPC .................... 455/41.1; 320/108; 307/104, 149
See application file for complete search history.

(56) References Cited

U.S. PATENT DOCUMENTS

| 8,624,546 B2 * | 1/2014 | Jung et al. ...................... 320/108 |
| 2004/0145342 A1 * | 7/2004 | Lyon .............................. 320/108 |
| 2005/0134213 A1 * | 6/2005 | Takagi et al. .................. 320/108 |
| 2008/0079396 A1 * | 4/2008 | Yamazaki et al. ............. 320/128 |
| 2009/0021219 A1 * | 1/2009 | Yoda et al. ..................... 320/137 |
| 2009/0079269 A1 * | 3/2009 | Jin ................................. 307/104 |
| 2009/0079270 A1 * | 3/2009 | Jin ................................. 307/104 |
| 2009/0224723 A1 * | 9/2009 | Tanabe .......................... 320/108 |
| 2009/0284227 A1 * | 11/2009 | Mohammadian et al. ..... 320/137 |
| 2010/0109443 A1 * | 5/2010 | Cook et al. .................... 307/104 |
| 2010/0142423 A1 * | 6/2010 | Zhu et al. ...................... 370/311 |
| 2010/0201201 A1 * | 8/2010 | Mobarhan et al. ............ 307/104 |
| 2010/0253281 A1 * | 10/2010 | Li ................................. 320/108 |
| 2010/0270970 A1 * | 10/2010 | Toya et al. .................... 320/108 |
| 2011/0057610 A1 * | 3/2011 | Yamazaki et al. ............ 320/108 |
| 2011/0074344 A1 * | 3/2011 | Park et al. ..................... 320/108 |
| 2011/0101788 A1 * | 5/2011 | Sun et al. ...................... 307/104 |
| 2011/0115432 A1 * | 5/2011 | El-Maleh et al. ............ 320/108 |
| 2011/0115433 A1 * | 5/2011 | Lee et al. ...................... 320/108 |
| 2011/0221391 A1 * | 9/2011 | Won et al. ..................... 320/108 |
| 2011/0260550 A1 * | 10/2011 | Jung et al. ..................... 307/104 |
| 2011/0270462 A1 * | 11/2011 | Amano et al. ................ 700/297 |
| 2011/0311084 A1 * | 12/2011 | Drader .......................... 381/315 |
| 2011/0316475 A1 * | 12/2011 | Jung et al. ..................... 320/108 |

(Continued)

*Primary Examiner* — Nay A Maung
*Assistant Examiner* — Erica Fleming-Hall
(74) *Attorney, Agent, or Firm* — Birch, Stewart, Kolasch & Birch, LLP

(57) ABSTRACT

An electronic device includes: a device main body having a battery; a power reception unit configured to receive a first wireless power signal formed by a first apparatus; a charging unit configured to charge the battery based on the received first wireless power signal; a power conversion unit configured to form a second wireless power signal for transmitting power to a second apparatus by using power of the battery; and a controller configured to determine whether to activate a power reception function or a power transmission function, wherein when the power reception function is activated, the controller controls the power reception unit to receive the first wireless power signal, and when the power transmission function is activated, the controller controls the power conversion unit to form the second wireless power.

13 Claims, 8 Drawing Sheets

(56) References Cited

U.S. PATENT DOCUMENTS

| | | | |
|---|---|---|---|
| 2012/0001592 A1* | 1/2012 | Fukaya | 320/108 |
| 2012/0104997 A1* | 5/2012 | Carobolante | 320/108 |
| 2012/0161531 A1* | 6/2012 | Kim | 307/104 |
| 2012/0193999 A1* | 8/2012 | Zeine | 307/104 |
| 2012/0262004 A1* | 10/2012 | Cook et al. | 307/104 |
| 2012/0326659 A1* | 12/2012 | Shukuya | 320/108 |
| 2013/0024059 A1* | 1/2013 | Miller et al. | 701/22 |
| 2013/0044793 A1* | 2/2013 | Haartsen | 375/219 |
| 2013/0249306 A1* | 9/2013 | Kim et al. | 307/104 |
| 2013/0278209 A1* | 10/2013 | Von Novak et al. | 320/108 |
| 2014/0008990 A1* | 1/2014 | Yoon | 307/104 |
| 2014/0021797 A1* | 1/2014 | Jung et al. | 307/104 |
| 2014/0062212 A1* | 3/2014 | Sun et al. | 307/104 |
| 2014/0111031 A1* | 4/2014 | Lee et al. | 307/149 |

* cited by examiner ated second wireless power signal.

WIRELESS POWER TRANSMISSION AND COMMUNICATION BETWEEN DEVICES

The present disclosure relates to subject matter contained in priority Korean Application No. 10-2011-0064029, filed on Jun. 29, 2011, which is herein expressly incorporated by reference in its entirety.

FIELD OF THE INVENTION

The present invention relates to wireless power transmission and, more particularly, to wireless power transmission between devices.

DESCRIPTION OF THE RELATED ART

Recently, a method of wirelessly supplying electrical energy to electronic devices in a contactless manner has been used instead of a conventional method of supplying electrical energy to electronic devices through a fixed line. An electronic device that receives energy wirelessly may be directly driven by the received wireless power, or a battery thereof may be charged with the received wireless power and the electronic device may be driven by the charged power.

SUMMARY OF THE INVENTION

An aspect of the present invention provides an apparatus for supporting wireless power transmission between devices, and an operation method thereof. In detail, the present disclosure provides an apparatus supporting both a function of transmitting wireless power and a function of receiving wireless power to thereby propose a method of relaying power between devices, a method of using communication resource by providing power, and a method of receiving information regarding an operation of a power reception apparatus and displaying the same.

According to an aspect of the present invention, there is provided an electronic device. The electronic device may include: a device main body having a battery; a power reception unit configured to receive a first wireless power signal formed by a first apparatus; a charging unit configured to charge the battery based on the received first wireless power signal; a power conversion unit configured to form a second wireless power signal for transmitting power to a second apparatus by using power of the battery; and a controller configured to determine whether to activate a power reception function or a power transmission function, wherein when the power reception function is activated, the controller controls the power reception unit to receive the first wireless power signal, and when the power transmission function is activated, the controller controls the power conversion unit to form the second wireless power.

The embodiments and any other embodiments may include one or more features as follows.

The controller may receive a power control message from the second apparatus and determine whether to activate the power transmission function based on the received power control message. The power control message may be a transmission request message of the second wireless power signal, and the controller may activate the power transmission function based on the transmission request message.

The power conversion unit may receive a second wireless power signal modulated by the second apparatus, and the power control message may be received through the modulated second wireless power signal.

The electronic device may further include: a communication unit configured to transmit and receive user data through a connection with the second apparatus, wherein when the power transmission function with respect to the second apparatus is activated, the controller may control the communication unit to transmit and receive user data through the connection. The controller may establish the connection with the second apparatus based on access information, and the access information may be included in the power control message received by the power conversion unit so as to be received. The access information may be an address of the second apparatus, authentication information, device identification information, control information for a relay service, or control information for tethering.

The electronic device may further include: a display unit, wherein the controller may display the user data of the second apparatus received through the communication unit on the display unit. The user data may be screen data of the second apparatus or information regarding an event which has occurred in the second apparatus.

The controller may form the second wireless power signal by using transmitted power based on the first wireless power signal.

The electronic device may further include: a coil connected to the power reception unit and the power conversion unit, wherein the coil may be used to receive the first wireless power signal and form the second wireless power signal.

According to another aspect of the present invention, there is provided an electronic device. The electronic device may include: a power reception unit configured to receive a first wireless power signal formed by a first apparatus; a power conversion unit configured to form a second wireless power signal for transmitting power to a second apparatus by using power obtained based on the first wireless power signal and receive second wireless power signal modulated by the second apparatus; a communication unit configured to transmit and receive user data through a connection with the second apparatus; and a controller configured to receive access information through the modulated second wireless power signal and establish the connection with the second apparatus based on the access information.

According to another aspect of the present invention, there is provided an electronic device including: a power reception unit configured to receive a wireless power signal for transmitting power from a power transmission device and modulating the wireless power signal such that it includes a power control message; a communication unit configured to transmit and receive user data through a connection with the power transmission device; and a controller configured to provide control to transmit a power control message for requesting a transmission of the wireless power signal to the power transmission device, transmit a control message including access information for establishing the connection to the power transmission device, establish the connection based on the access information, and transmit screen data or event information to the power transmission device through the communication unit. The electronic device may further include: a charging unit configured to charge a battery, wherein the controller controls the charging unit to charge the battery based on the received wireless power signal.

According to embodiments disclosed in the present disclosure, an electronic device supporting a mutual wireless power transmission may wirelessly transmit power to a different device. A device having a wireless power reception function is able to receive power from an electronic device supporting a mutual wireless power transmission in an environment in which there is no available wireless charger around.

In particular, when an electronic device (e.g., a notebook computer) having a larger capacity battery supports a mutual wireless power transmission, it can provide power remaining in the large capacity battery to a different wireless power reception device (e.g., a mobile terminal).

Also, the electronic device supporting a mutual wireless power transmission may wirelessly provide power to a different electronic device and use network resources provided by the different electronic device (e.g., a mobile terminal, an access point, and the like.) in reward for the provision of power.

Also, the electronic device supporting a mutual wireless power transmission may receive a screen image or data regarding an event from a different electronic device which receives wireless power, and display information regarding the different electronic device while power is being transmitted.

Also, the electronic device supporting a mutual wireless power transmission may directly provide wireless power, which has been received from a different wireless power transmission device, to a different electronic device without charging the received power, or may relay power such that it charges the received power and then provides the charged power to the different electronic device.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
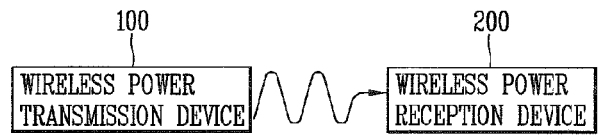
FIG. 1 is a conceptual view of a wireless power transmission apparatus and a wireless power reception apparatus according to embodiments of the present invention.

The technology disclosed in the present disclosure is applied to wireless power transmission. However, without being limited thereto, the technology disclosed in the present disclosure may be applicable to any power transmission systems and methods, wireless charging circuits and methods, and methods and apparatus using wirelessly transmitted power to which the technical concept of the technology can be applicable, The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

In the present application, it is to be understood that the terms such as "including" or "having," and the like, are intended to indicate the presence of the features, numbers, operations, actions, components, parts, or combinations thereof disclosed in the specification, and are not intended to preclude the possibility that one or more other features, numbers, operations, actions, components, parts, or combinations thereof may exist or may be added.

In the following description, usage of suffixes such as 'module', 'part', or 'unit', used for With reference to elements is given merely to facilitate explanation of the present invention, without having any significant meaning by itself. It should be noted that 'module', 'part', or 'unit' can be substitutively, alternatively, or mixedly used.

While terms such as "first" and "second," and the like, may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

The embodiments of the present invention will now be described with reference to the accompanying drawings, in which like numbers refer to like elements throughout, and a repetitive explanation will be omitted.

In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Conceptual View of Wireless Power Transmission Apparatus and Wireless Power Reception Apparatus FIG. 1 is a conceptual view of a wireless power transmission apparatus and a wireless power reception apparatus according to embodiments of the present invention.

As can be seen with reference to FIG. 1, the wireless power transmission apparatus 100 may be a power transfer apparatus wirelessly transferring power required for the wireless power reception apparatus 200.

Also, the wireless power transmission apparatus 100 may be a wireless charging apparatus for charging a battery of the wireless power reception apparatus 200 by wirelessly transferring power thereto.

Besides, the wireless power transmission apparatus 100 may be implemented as various types of apparatuses transferring power to the wireless power reception apparatus 200 that requires power in a contactless manner (namely, in a state in which the wireless power transmission device 100 is not in contact with the wireless power reception device).

The wireless power reception apparatus 200 is an apparatus that can be operable upon receiving power wirelessly from the wireless power transmission apparatus 100. Also, the wireless power reception apparatus 200 may charge a battery thereof by using the received wireless power.

The wireless power transmission apparatus 100 disclosed in the present disclosure may be implemented to have a wireless power reception function provided in the wireless power reception apparatus 200. The implementation of such an electronic device having both functions of transmitting and receiving wireless power will be described later with reference to FIG. 7.

Meanwhile, the wireless power reception apparatus 200 wirelessly receiving power should be construed to include every portable electronic device, e.g., a mobile phone, a cellular phone, a smart phone, a personal digital assistant (PDA), a portable multimedia player (PMP), a tablet or a multimedia device, as well as input/output devices such as a keyboard, a mouse, an image or audio auxiliary output device, and the like. As described hereinafter, the wireless power reception apparatus 200 may be a mobile communication terminal (e.g., a mobile phone, a cellular phone or a tablet) or a multimedia device. An embodiment in which the wireless power reception apparatus 200 is implemented as a mobile terminal will be described later with reference to FIG. 8.

Also, the wireless power transmission apparatus 100 described in the present disclosure may be implemented as a device that mainly performs power charging like a wireless charger, and the wireless power reception apparatus 200 having a wireless power reception function may be implemented in the form of a mobile communication terminal or a multimedia device as mentioned above.

Meanwhile, in order to wirelessly transfer power to the wireless power reception apparatus 200 without a contact therebetween, the wireless power transmission apparatus 100 may use one or more wireless power transmission methods. Namely, the wireless power transmission apparatus 100 may transfer power by using one or more of inductive coupling based on an electromagnetic induction phenomenon occurring by the wireless power signal and electromagnetic resonance coupling based on an electromagnetic resonance phenomenon occurring by a wireless power signal of a particular frequency.

The wireless power transmission according to inductive coupling is a technique for wirelessly transferring power by using primary and secondary coils. Namely, in this technique, power is transmitted as a current is induced to another coil by a varied electric field generated in one coil according to the electromagnetic induction phenomenon.

Wireless power transmission according to electromagnetic resonance coupling refers to that electromagnetic resonance is generated in the wireless power reception apparatus 200 by a wireless power signal transmitted from the wireless power transmission apparatus 100, and power is transferred from the wireless power transmission apparatus 100 to the wireless power reception apparatus 200 by the electromagnetic resonance phenomenon.

Hereinafter, embodiments of the wireless power transmission apparatus 100 and the electronic devices 200 disclosed in the present disclosure, will be described in detail. The same reference numerals are used to denote the same components although the same components are illustrated in different drawings.

Figure 2A:
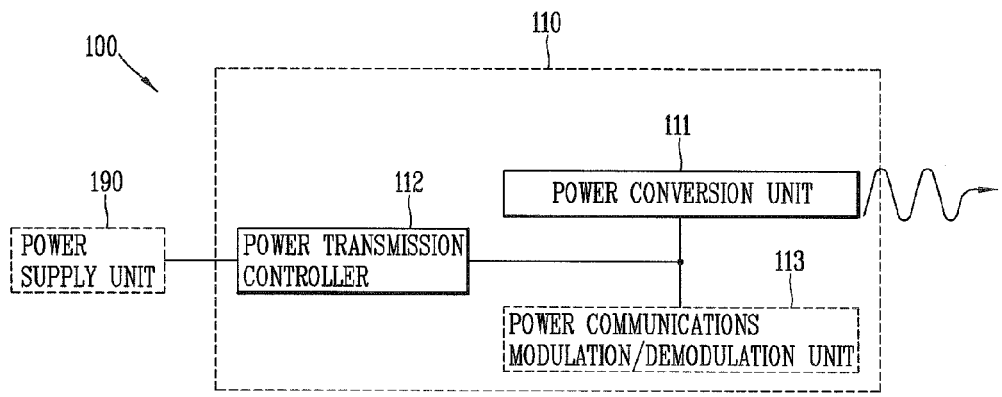
FIGS. 2(a) and 2(b) are block diagrams illustrating configurations of a wireless power transmission apparatus 100 and a wireless power reception apparatus 200 that may be employed in embodiments of the present disclosure, respectively.
Figure 2B:
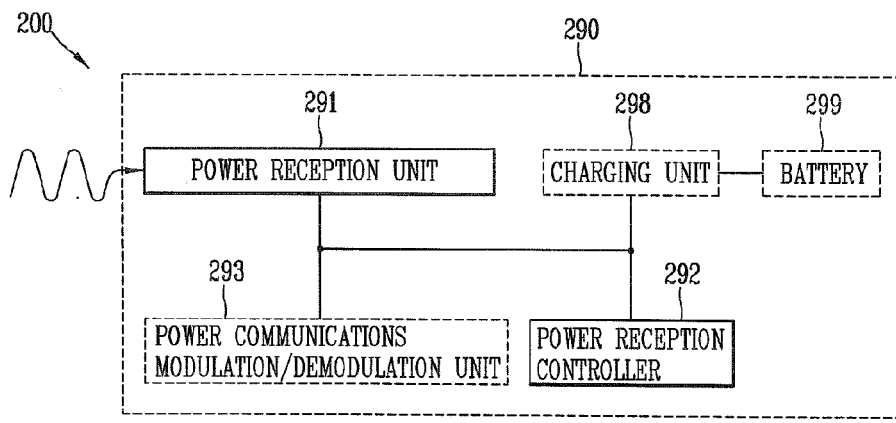

FIGS. 2(a) and 2(b) are block diagrams illustrating configurations of a wireless power transmission apparatus 100 and a wireless power reception apparatus 200 that may be employed in embodiments of the present disclosure, respectively.

Wireless Power Transmission Apparatus

With reference to FIG. 2(a), the wireless power transmission apparatus 100 includes a power transmission unit 110. The power transmission unit 110 may include a power conversion unit 111 and a power transmission controller 112.

The power conversion unit 111 converts power supplied from a transmission side power supply unit 190 into a wireless power signal and transmits the converted wireless power signal to the wireless power reception apparatus 200. The wireless power signal transmitted by the power conversion unit 111 is formed in a magnetic field or electromagnetic field having oscillation characteristics. To this end, the power conversion unit 111 may include a coil by which the wireless power signal is generated.

The power conversion unit 111 may include a component for forming a different type of wireless power signal according to each wireless power transmission method.

In some embodiments, the power conversion unit 111 may include a primary coil for generating a varied magnetic field so as to induce a current to a secondary coil of the wireless power reception apparatus 200 according to inductive coupling. Also, in some embodiments, the power conversion unit 111 may include a coil (or an antenna) for forming a magnetic field having a particular resonance frequency so as to generate a resonance phenomenon in the wireless power reception apparatus 200 according to electromagnetic resonance coupling.

Also, in some embodiments, the power conversion unit 111 may transfer power by using one or more of inductive coupling and electromagnetic resonance coupling as mentioned above.

Among components included in the power conversion unit 111, those based on inductive coupling will be described later with reference to FIG. 4, and those based on electromagnetic resonance coupling will be describe with reference to FIG. 6.

Meanwhile, the power conversion unit 111 may further include a circuit capable of controlling characteristics such as a frequency used to form the wireless power signal, an applied voltage, a current, or the like.

The power transmission controller 112 controls each of the components included in the power transmission unit 110. In some embodiments, the power transmission controller 112 may be implemented to be integrated with another controller (not shown) controlling the wireless power transmission apparatus 100.

Meanwhile, an area in which the wireless power signal may reach may be divided into two types of areas. First, an active area refers to an area through which the wireless power signal for transferring power to the wireless power reception apparatus 200 passes. Next, a semi-active area refers to an interest area in which the wireless power transmission apparatus 100 can detect the presence of the wireless power reception apparatus 200. Here, the power transmission controller 112 may detect whether or not the wireless power reception apparatus 200 has been placed in or removed from the active area or the semi-active area. In detail, the power transmission controller 112 may detect whether or not the wireless power reception apparatus 200 has been placed in the active area or the semi-active area by using a wireless power signal formed by the power conversion unit 111 or by using a sensor. For example, the power transmission controller 112 may detect the presence of the wireless power reception apparatus 200 by monitoring whether or not the characteristics of power for generating the wireless power signal by the power conversion unit 111 is changed as the wireless power signal is affected by the wireless power reception apparatus 200 present in the semi-active area. Here, the active area and the semi-active area may vary according to the wireless power transmission methods such as inductive coupling, electromagnetic resonance coupling, and the like.

The power transmission controller 112 may determine whether to perform a process of identifying the wireless power reception apparatus 200 or whether to start a wireless power transmission, according to the results obtained by detecting the presence of the wireless power reception apparatus 200.

Also, the power transmission controller 112 may determine one or more characteristics among the frequency, voltage, and current of the power conversion unit 111 for generating the wireless power signal. The determination of the characteristics may be made according to conditions of the wireless power transmission apparatus 100 or according to conditions of the wireless power reception apparatus 200. In some embodiments, the power transmission controller 112 may determine the characteristics based on device identification information of the wireless power reception apparatus 200. In some embodiments, the power transmission controller 112 may determine the characteristics based on required power information of the wireless power reception apparatus 200 or profile information regarding the required power of the wireless power reception apparatus 200. The power transmission controller 112 may receive a power control message from the wireless power reception apparatus 200. The power transmission controller 112 may determine one or more characteristics among the frequency, voltage and current of the power conversion unit 111, based on the received power control message, and may perform a different control operation based on the power control message.

For example, the power transmission controller 112 may determine one or more characteristics among the frequency, voltage and current used to generate the wireless power signal, according to the power control message including one or more of rectified electric energy information, charging state information and identification information of the wireless power reception apparatus 200.

As another control operation using the power control message, the wireless power transmission apparatus 100 may perform a general control operation related to wireless power transmission based on the power control message. For example, the wireless power transmission apparatus 100 may receive information to be audibly or visibly output in relation to the wireless power reception apparatus 200 or may receive information required for authentication between devices, through the power control message.

In some embodiments, the power transmission controller 112 may receive the power control message through the wireless power signal. In some embodiments, the power transmission controller 112 may receive the power control message through a method of receiving user data.

In order to receive power control message, the wireless power transmission apparatus 100 may further include a power communications modulation/demodulation unit 113 electrically connected to the power conversion unit 111. The power communications modulation/demodulation unit 113 may be used to receive the power control message by demodulating the wireless power signal modulated by the wireless power reception apparatus 200. Besides, the power transmission controller 112 may obtain the power control message by receiving user data including the power control message by a communication means (not shown) included in the wireless power transmission apparatus 100.

Wireless Power Reception Apparatus

With reference to FIG. 2(*b*), the wireless power reception apparatus 200 includes a power supply unit 290. The power supply unit 290 supplies power required for operating the wireless power reception apparatus 200. The power supply unit 290 may include a power reception unit 291 and a power reception controller 292.

The power reception unit 291 receives power wirelessly transmitted from the wireless power transmission apparatus 100.

The power reception unit 291 may include a component required for receiving the wireless power signal according to a wireless power transmission method. The power reception unit 291 may receive power according to one or more wireless power transmission methods, and in this case, the power reception unit 291 may include components required according to respective wireless power transmission methods.

First, the power reception unit 291 may include a coil for receiving a wireless power signal transmitted in the form of a magnetic field or electromagnetic field having vibration characteristics.

For example, in some embodiments, the power reception unit 291 may include a secondary coil to which a current is induced by a varied magnetic field as a component according to inductive coupling. Also, in some embodiments, the power reception unit 291 may include a coil and a resonance circuit in which resonance phenomenon occurs by a magnetic field having a particular resonance frequency, as components according to electromagnetic resonance coupling.

In some embodiments, the power reception unit 291 may receive power according to one or more wireless power transmission methods, and in this case, the power reception unit 291 may be implemented to receive power by using a single coil or may be implemented to receive power by using coils formed to be different according to the respective wireless power transmission methods.

Among components included in the power reception unit 291, embodiments based on inductive coupling will be described later with reference to FIG. 4, and embodiments based on electromagnetic resonance coupling will be described later with reference to FIG. 6.

Meanwhile, the power reception unit 291 may further include a rectifying circuit (or a rectifier) and a smoothing circuit (or a regulator) in order to convert the wireless power signal into a DC. The power reception unit 291 may further include a circuit for preventing an overvoltage or an overcurrent from being generated by the received power signal.

The power reception controller 292 controls the respective components included in the power supply unit 290.

In detail, the power reception controller 292 may transfer a power control message to the wireless power transmission apparatus 100. The power control message may instruct the wireless power transmission apparatus 100 to start or end a transmission of a wireless power signal. Or, the power control message may instruct the wireless power transmission apparatus 100 to control the characteristics of the wireless power signal.

In some embodiments, the power reception controller 292 may transmit the power control message through the wireless power signal. Also, in some embodiments, the power reception controller 292 may transmit the power control message through a method of using user data.

In order to transfer the power control message, the wireless power reception apparatus 200 may further include a power communications modulation/demodulation unit 293 electrically connected to the power reception unit 291. Like the case of the wireless power transmission apparatus 100 as described above, the power communications modulation/demodulation unit 293 may be used to transmit the power control message through the wireless power signal. The power communications modulation/demodulation unit 293 may be used as a means for adjusting a current and/or voltage flowing through the power conversion unit 111 of the wireless power transmission apparatus 100. Hereinafter, the method used by the respective power communications modulation/demodulation unit 113 and 293 of the wireless power transmission apparatus 100 and the wireless power reception apparatus 200 to transmit and receive a power control message through a wireless power signal will be described.

The wireless power signal generated by the power conversion unit 111 is received by the power reception unit 291. Here, the power reception controller 292 controls the power communications modulation/demodulation unit 293 of the wireless power reception apparatus 200 to modulate the wireless power signal. For example, the power reception controller 292 may change reactance of the power communications modulation/demodulation unit 293 connected to the power reception unit 291 to thus perform a modulation process to allow the electric energy received from the wireless power signal to be changed accordingly. The change in the electric energy received from the wireless power signal brings about a change in current and/or voltage of the power conversion unit 111 that forms the wireless power signal. Here, the power communications modulation/demodulation unit 113 of the wireless power transmission apparatus 100 performs a demodulation process upon detecting the change in the current and/or voltage of the power conversion unit 111.

Namely, the power reception controller 292 generates a packet including a power control message desired to be transmitted to the wireless power transmission apparatus 100 and modulates the wireless power signal to have the packet. The power transmission controller 112 decodes the packet based on the demodulation process performing results from the power communications modulation/demodulation unit 113, to thus obtain the power control message included in the packet.

Besides, in some embodiments, the power reception controller 292 may transmit user data including the power control message by a communication unit (not shown) included in the wireless power reception apparatus 200 to thereby transmit a power control message to the wireless power transmission apparatus 100.

Besides, the power supply unit 290 may further include a charging unit 298 and a battery 299.

The wireless power reception apparatus 200 receiving power for an operation thereof from the power supply unit 290 may be operated by the power transferred from the wireless power transmission apparatus 100 or may charge the battery 299 with the transferred power and then be operated by the power charged in the battery 299. Here, the power reception controller 292 may control the charging unit 298 to perform charging by using the transmitted power.

Hereinafter, the wireless power transmission apparatus and the electronic device applicable to the embodiments of the present disclosure will be described.

First, a method of transferring power, by the wireless power transmission apparatus, to the wireless power reception apparatus according to embodiments supporting inductive coupling will be described with reference to FIGS. 3 to 4

Inductive Coupling

Figure 3:
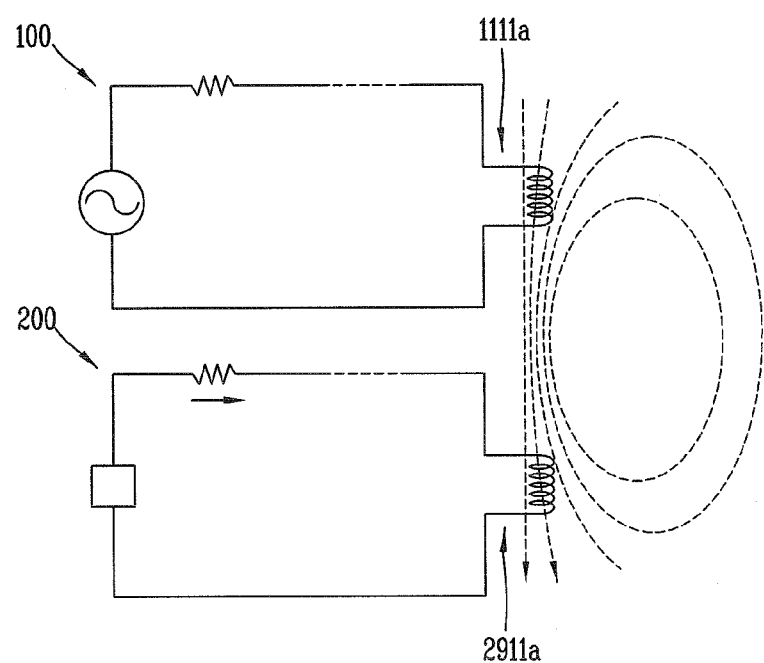
FIG. 3 illustrates a concept of wirelessly transmitting power from the wireless power transmission apparatus to the wireless power reception apparatus according to inductive coupling.

FIG. 3 illustrates a concept of wirelessly transmitting power from the wireless power transmission apparatus to the wireless power reception apparatus according to inductive coupling.

In case in which power transmission of the wireless power transmission apparatus 100 follows inductive coupling, when the intensity of current flowing through a primary coil of the power transmission unit 110 is changed, a magnetic field passing through the primary coil is changed by the current. The changed magnetic field generates induced electromotive force at a secondary coil in the wireless power reception apparatus 200.

According to inductive coupling, the power conversion unit 111 of the wireless power transmission apparatus 100 is configured to include a transmission coil (Tx coil) 1111a operating as a primary coil in magnetic induction. The power reception unit 291 of the wireless power reception apparatus 200 includes a reception coil (Rx coil) 2911a operating as a secondary coil in the magnetic induction.

First, the wireless power transmission apparatus 100 and the wireless power reception apparatus 200 are disposed such that the transmission coil 1111a of the wireless power transmission apparatus 100 and the reception coil 2911a of the wireless power reception apparatus 200 are close to each other. Thereafter, when the power transmission controller 112 provides control to change the current of the transmission coil 1111a, the power reception unit 291 provides control to supply power to the wireless power reception apparatus 200 by using the electromotive force induced to the reception coil 2911a.

The efficiency of the wireless power transmission according to inductive coupling is rarely affected by frequency characteristics, but affected by the alignment and distance between the wireless power transmission apparatus 100 and the wireless power reception apparatus 200 including the coils, respectively.

Meanwhile, in order to wirelessly transmit power according to inductive coupling, the wireless power transmission apparatus 100 may include a flat interface surface (not shown). One or more wireless power reception apparatuses may be placed on the interface surface, and the transmission coil 1111a may be mounted beneath the interface surface. In this case, a vertical spacing is formed to be small between the transmission coil 1111a mounted beneath the interface surface and the reception coil 2911a of the wireless power reception apparatus 200 placed on the interface surface, whereby the distance between the coils is sufficiently small such that the wireless power transmission according to inductive coupling can be efficiently performed.

Also, an alignment indication unit (not shown) indicating a position at which the wireless power reception apparatus 200 is to be placed may be formed on the interface surface. The alignment indication unit indicates a position of the wireless power reception apparatus 200, at which the transmission coil 1111a mounted beneath the interface surface and the reception coil 2911a can be appropriately aligned. In some embodiments, the alignment indication unit may be a simple mark. In some embodiments, the alignment indication unit may be formed to have a protrusion structure guiding the position of the wireless power reception apparatus 200. In some embodiments, the alignment indication unit may be formed in the form of a magnetic body such as a magnet mounted beneath the interface surface, to guide the coils to be appropriately aligned by attraction between the magnetic body and a magnetic body having different polarity and mounted in the wireless power reception apparatus 200.

Meanwhile, the wireless power transmission apparatus 100 may be formed to include one or more transmission coils. The wireless power transmission apparatus 100 may selectively use some coils, among the one or more transmission coils, appropriately aligned with the reception coil 2911a of the wireless power reception apparatus 200 to enhance power transmission efficiency.

Hereinafter, configurations of the wireless power transmission apparatus and the wireless power reception apparatus based on inductive coupling applicable to the embodiments disclosed in the present disclosure will be described in detail.

Figure 4A:
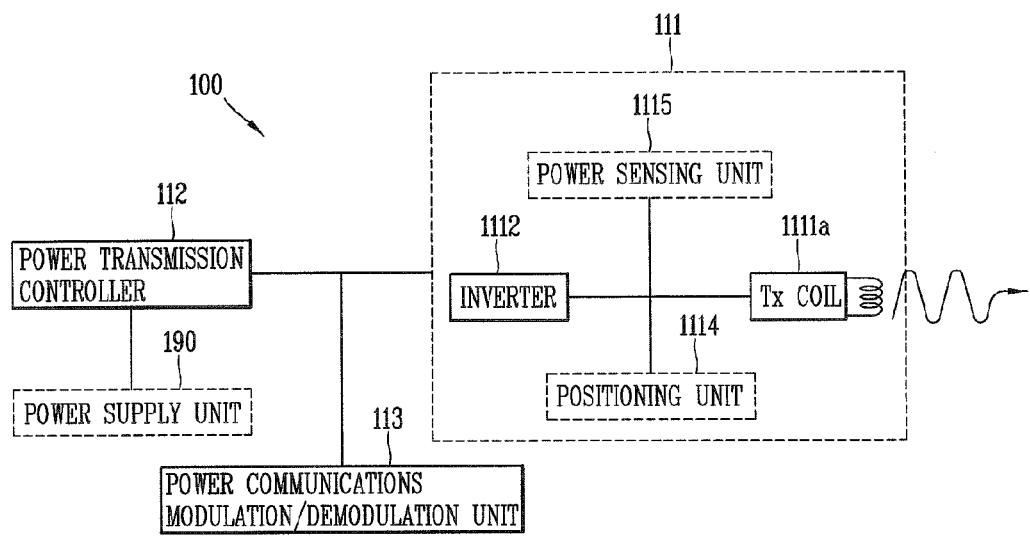
FIGS. 4(a) and 4(b) are block diagrams illustrating portions of the configurations of the wireless power transmission apparatus 100 and the wireless power reception apparatus 200 based on electromagnetic induction that can be employed in embodiments of the present disclosure.
Figure 4B:
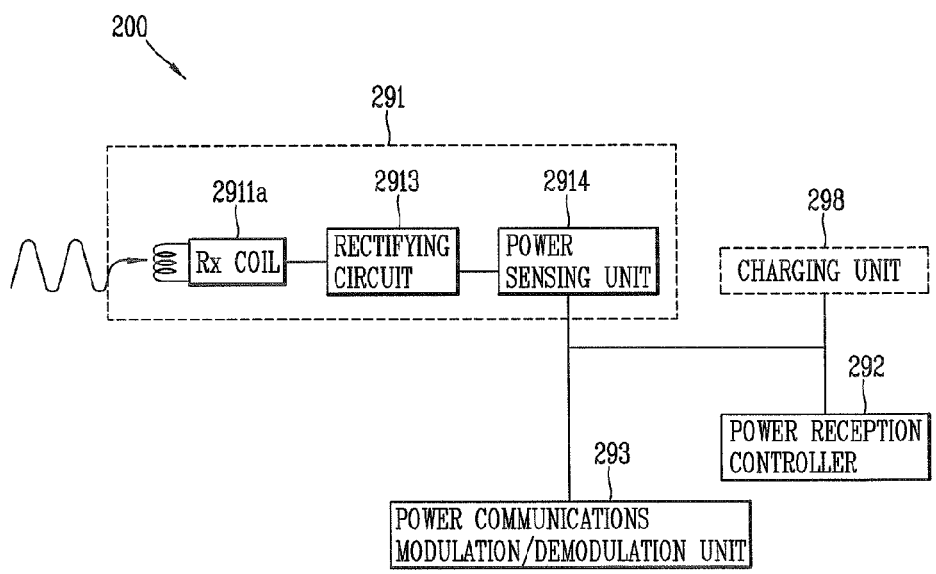

Wireless Power Transmission Apparatus and Wireless Power Reception Apparatus Based on Inductive Coupling FIGS. 4(a) and 4(b) are block diagrams illustrating portions of the configurations of the wireless power transmission apparatus 100 and the wireless power reception apparatus 200 based on electromagnetic induction that can be employed in embodiments of the present disclosure. The configuration of the power transmission unit 110 included in the wireless power transmission apparatus 100 will be described with reference to FIG. 4(a), and the configuration of the power supply unit 230 included in the wireless power reception apparatus 200 will be described with reference to FIG. 4(b).

With reference to FIG. 4(a), the power conversion unit 111 of the wireless power transmission unit 100 may include a transmission coil (Tx coil) 1111a and an inverter 1112.

The transmission coil 1111a, as described above, forms a magnetic field corresponding to a wireless power signal according to a change in a current. In some embodiments, the transmission coil 1111a may be implemented as a planar spiral type coil. In some embodiments, the transmission coil 1111a may be implemented as a cylindrical solenoid type coil.

The inverter 1112 transforms a DC input obtained from the power supply unit 190 into an AC waveform. The AC current transformed by the inverter 112 drives a resonance circuit including the transmission coil 1111a and a capacitor (not shown) to form a magnetic field in the transmission coil 1111a.

The power conversion unit 111 may further include a positioning unit 1114.

The positioning unit 1114 may move or rotate the transmission coil 1111a to improve the efficiency of the wireless power transmission according to inductive coupling. This is because, as described above, power transmission according to inductive coupling is affected by the alignment and distance between the wireless power transmission apparatus 100 and the wireless power reception apparatus 200, which include the primary and secondary coils, respectively. In particular, the positioning unit 1114 may be used when the wireless power reception apparatus 200 does not exist in the active area of the wireless power transmission apparatus 100.

Thus, the positioning unit 1114 may include a driving unit (not shown) for moving the transmission coil 1111a such that the distance between the centers of the transmission coil 1111a of the wireless power transmission apparatus 100 and the reception coil 2911a of the wireless power reception apparatus 200 is within a certain range, or rotating the transmission coil 1111a such that the centers of the transmission coil 1111a and the reception coil 2911a overlaps.

To this end, the wireless power transmission apparatus 100 may be further provided with a position detection unit (not shown) including a sensor for sensing the position of the wireless power reception apparatus 200 and the power transmission controller 112 may control the positioning unit 1114 based on information regarding the position information of the wireless power reception apparatus 200 received from the position detection sensor.

Also, to this end, the power transmission controller 112 may receive control information regarding the alignment or distance between the wireless power transmission apparatus 100 and the wireless power reception apparatus 200 through the power communications modulation/demodulation unit 113, and control the positioning unit 1114 based on the received control information regarding the alignment or distance.

If the power conversion unit 111 is configured to include a plurality of transmission coils, the positioning unit 1114 may determine which of the plurality of transmission coils is to be used to transmit power.

Meanwhile, the power conversion unit 111 may further include a power sensing unit 1115. The power sensing unit 1115 of the wireless power transmission apparatus 100 monitors a current or a voltage flowing through the transmission coil 1111a. The power sensing unit 1115 is used to check whether or not the wireless power transmission apparatus 100 normally operates. The power sensing unit 1115 may detect a voltage or a current of power supplied from the outside and check whether or not the detected voltage or current exceeds a threshold value. Although not shown, the power sensing unit 1115 may include a resistor for detecting a voltage or a current of power supplied from the outside and a comparator for comparing the detected voltage or current of the power with a threshold value and outputting the comparison results. Based on the check results from the power sensing unit 1115, the power transmission controller 112 may control a switching unit (not shown) to cut off power applied to the transmission coil 1111a.

With reference to FIG. 4(b), the power supply unit 290 of the wireless power reception apparatus 200 may include a reception coil (Rx coil) 2911a and a rectifying circuit 2913.

A current is induced in the reception coil 2911a according to a change in a magnetic field formed from the transmission coil 1111a. Like the transmission coil 1111a, the reception coil 2911a may be implemented as a planar spiral type coil or a cylindrical solenoid type coil according to embodiments.

Series and parallel capacitors may be connected to the reception coil 2911a so as to enhance the reception efficiency of wireless power or to perform resonant detection.

The reception coil 2911a may be implemented as a single coil or a plurality of coils.

The rectifying circuit 2913 performs full-wave rectification on a current so as to convert an AC current into a DC. The rectifying circuit 2913 may be implemented as, for example, a full bridge rectifying circuit comprised of four diodes or a circuit using active components.

The rectifying circuit 2913 may further include a smoothing circuit (or a regulator) for changing the rectified current into a smoother and more stable DC current. Output power of the rectifying circuit 2913 is supplied to the respective components of the power supply unit 290. Also, the rectifying circuit 2913 may further include a DC-DC converter for converting the output DC power into an appropriate voltage in order to fit power required in the respective components (e.g., a circuit such as the charging unit 298) of the power supply unit 290.

The power communications modulation/demodulation unit 293 is connected to the power reception unit 291. The power communications modulation/demodulation unit 293 may be configured as a resistive element whose resistance is changed over a DC current, or may be configured as a capacitive element whose reactance is changed over an AC current. The power reception controller 292 may modulate a wireless power signal received by the power reception unit 291 by changing resistance or reactance of the power communications modulation/demodulation unit 293.

Meanwhile, the power supply unit 290 may further include a power sensing unit 2914. The power sensing unit 2914 of the wireless power reception apparatus 200 monitors a voltage and/or a current of power rectified by the rectifying circuit 2913, and when the voltage and/or current of the rectified power exceeds a threshold value according to the monitoring results, the power reception controller 292 transfers a power control message to the wireless power transmission apparatus 100 so as to transmit appropriate power.

Hereinafter, a method of transferring power by the wireless power transmission apparatus according to embodiments of the present invention supporting electromagnetic resonance coupling will be described with reference to FIGS. 5 to 6.

Electromagnetic Resonance Coupling

Figure 5:
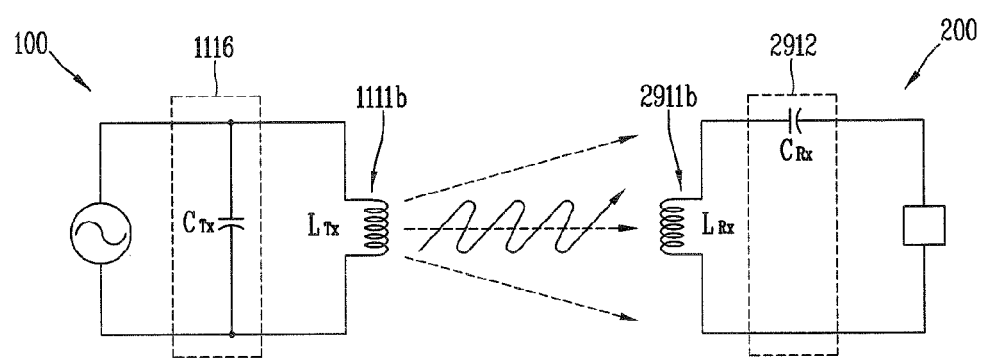
FIG. 5 illustrates a concept of wirelessly transmitting power from the wireless power transmission apparatus to the wireless power reception apparatus according to electromagnetic resonance coupling.

FIG. 5 illustrates a concept of wirelessly transmitting power from the wireless power transmission apparatus to the wireless power reception apparatus according to electromagnetic resonance coupling.

First, resonance (or consonance) will be briefly described as follows. Resonance refers to a phenomenon in which a vibrometer periodically receives external force having the same vibration frequency as natural frequency thereof so the amplitude of vibration is conspicuously increased. Resonance is a phenomenon that occurs in all vibrations such as a dynamic vibration, an electrical vibration, and the like. In general, when force enough to cause vibration is applied to the vibrometer is applied from the outside, if natural frequency of the vibrometer is equal to the frequency of vibration, the vibration grows stronger and the amplitude thereof is increased.

Based on the same principle, when a plurality of vibrators spaced apart within a certain distance vibrate at the same frequency, the plurality of vibrators resonate to each other, and in this case, resistance between the plurality of vibrators is reduced. In an electric circuit, a resonant circuit may be formed by using an inductor and a capacitor.

When power transmission from the wireless power transmission apparatus 100 follows electromagnetic resonance coupling, a magnetic field having a particular vibration frequency is formed by AC power in the power transmission unit 110. When a resonance phenomenon occurs by the formed magnetic field in the wireless power reception apparatus 200, power is generated according to the resonance phenomenon in the wireless power reception apparatus 200.

The resonance frequency may be determined, for example, by Equation 1 shown below:

$$f = \frac{1}{2\pi\sqrt{LC}}$$ [Equation 1]

Here, the resonance frequency (f) is determined by inductance (L) and capacitance (C) in a circuit. In a circuit forming a magnetic field by using coils, the inductance may be determined by the number of turns of the coils, and the like, and the capacitance may be determined by the interval between the coils, the area of the coils, and the like. In order to determine the resonance frequency, besides the coil, a capacitive resonant circuit may be connected to the circuit.

With reference to FIG. 5, in embodiments in which power is wirelessly transferred according to electromagnetic resonance coupling, the power conversion unit 111 of the wireless power transmission apparatus 100 may be configured to include a transmission coil (Tx coil) 1111b in which a magnetic field is formed and a resonance circuit 1116 for determining a particular oscillation frequency. The resonance circuit 1116 may be implemented by using a capacitive circuit (or a capacitor), and the particular oscillation frequency is determined based on the inductance of the transmission coil 1111b and the capacitance of the resonance circuit 1116.

The configuration of circuit element of the resonance generation unit 1116 may be implemented in various forms such that the power conversion unit 111 can form a magnetic field, and the present invention is not limited to the configuration in which it is connected in parallel to the transmission coil 1111b in parallel as shown in FIG. 5.

The power reception unit 291 of the wireless power reception apparatus 200 includes a resonance circuit 2912 and a reception coil (Rx coil) 2911b, configured such that a resonance phenomenon occurs by a magnetic field formed in the wireless power transmission apparatus 100. Namely, the resonance circuit 2912 may also be implemented by using a capacitive circuit, and may be configured such that resonance frequency determined based on the inductance of the reception coil 2911b and the capacitance of the resonance circuit 2912 is identical to that of the formed magnetic field.

The configuration of the circuit element in the resonance circuit 2912 may be implemented in various forms such that resonance takes place by the magnetic field in the power reception unit 291, and the present invention is not limited to the configuration in which the power reception unit 291 is connected in series to the reception coil 2911b as shown in FIG. 6.

The particular oscillation frequency in the wireless power transmission apparatus 100 has $L_{Tx}$ and $C_{Tx}$ and may be obtained by using Equation 1 above. Here, resonance takes place in the wireless power reception apparatus 200 when the results obtained by substituting $L_{RX}$ and $C_{RX}$ of the wireless power reception apparatus 200 into Equation 1 are equal to the particular oscillation frequency.

According to the embodiments supporting the wireless power transmission according to electromagnetic resonance coupling, when the wireless power transmission apparatus 100 and the wireless power reception apparatus 200 resonate at the same frequency, electromagnetic waves are transferred through a near electromagnetic field, so, if the frequencies are different, there is no energy transmission between the devices.

Accordingly, the efficiency of the wireless power transmission according to electromagnetic resonance coupling is greatly affected by frequency characteristics, while the efficiency of the wireless power transmission according to electromagnetic resonance coupling is less affected by the alignment and distance between the wireless power transmission apparatus 100 and the wireless power reception apparatus 200 including the respective coils, in comparison to inductive coupling.

Hereinafter, the configuration of the wireless power transmission apparatus and the wireless power reception apparatus according to electromagnetic resonance coupling applicable to embodiments of the present disclosure will be described in detail.

Figure 6A:
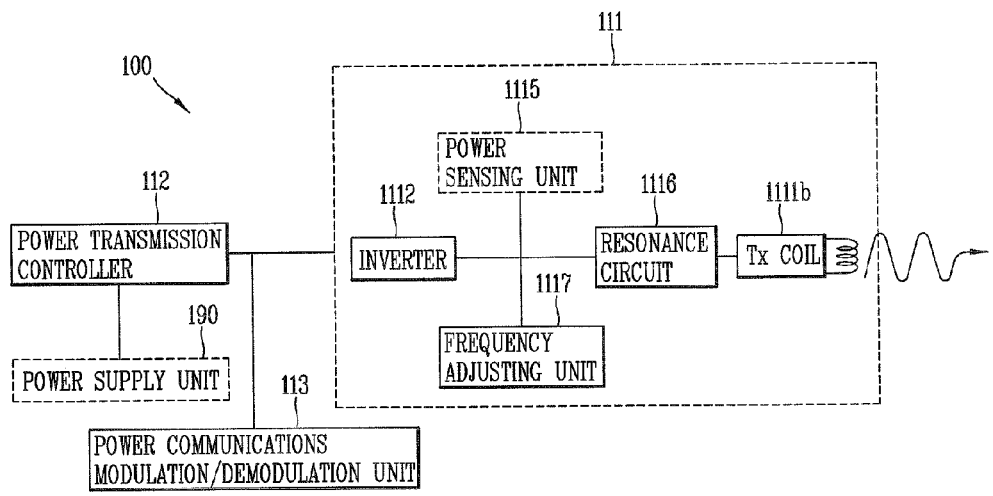
FIGS. 6(a) and 6(b) are block diagrams illustrating portions of the configurations of the wireless power transmission apparatus 100 and the wireless power reception apparatus 200 based on magnetic resonance that can be employed in embodiments of the present disclosure.
Figure 6B:
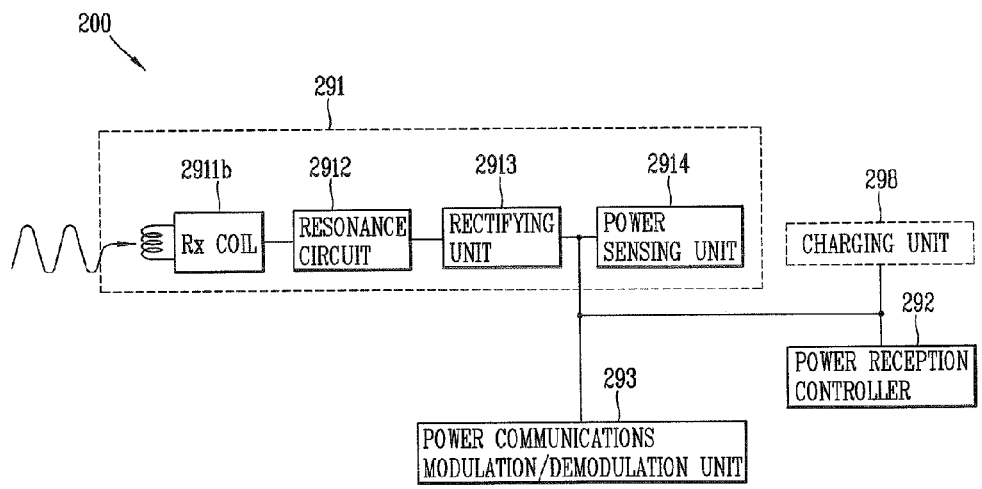

Wireless Power Transmission Apparatus Based on Electromagnetic Resonance Coupling FIGS. 6(a) and 6(b) are block diagrams illustrating portions of the configurations of the wireless power transmission apparatus 100 and the wireless power reception apparatus 200 based on magnetic resonance that can be employed in embodiments of the present disclosure.

The configuration of the power transmission unit 110 included in the wireless power transmission apparatus 100 will be described with reference to FIG. 6(a).

The power conversion unit 111 of the wireless power transmission apparatus 100 may include a transmission coil (Tx coil) 1111b, an inverter 1112 and a resonance circuit 1116. The inverter 1112 may be connected to the transmission coil 1111b and the resonance circuit 1116.

The transmission coil 1111b may be mounted separately from the transmission coil 1111a for transferring power according to inductive coupling, or may transfer power by using a single coil according to inductive coupling and electromagnetic resonance coupling.

As described above, the transmission coil 1111b forms a magnetic field for transferring power. When AC power is applied, the transmission coil 1111b and the resonance circuit 1116 generate a vibration, and here, oscillation frequency may be determined based on the inductance of the transmission coil 1111b and the capacitance of the resonance circuit 1116.

To this end, the inverter 1112 transforms a DC input obtained from the power supply unit 190 into an AC waveform, and the transformed AC current is applied to the transmission coil 1111b and the resonance circuit 1116.

Besides, the power conversion unit 111 may further include a frequency adjusting unit 1117 for changing the resonance frequency value of the power conversion unit 111. Since the resonance frequency of the power conversion unit 111 is determined based on the inductance and capacitance of the circuits constituting the power conversion unit 111 based on Equation 1, the power transmission controller 112 may control the frequency adjusting unit 1117 to change the inductance and/or the capacitance, thus determining the resonance frequency of the power conversion unit 111.

In some embodiments, the frequency adjusting unit 1117 may include a motor capable of changing capacitance by adjusting a distance between capacitors included in the resonance circuit 1116. In some embodiments, the frequency adjusting unit 1117 may include a motor capable of changing inductance by adjusting the number of turns or diameter of the transmission coil 1111b. In some embodiments, the frequency adjusting unit 1117 may include active elements for determining the capacitance and/or the inductance.

Meanwhile, the power conversion unit 111 may further include a power sensing unit 1115. The operation of the power sensing unit 1115 is the same as described above.

The configuration of the power supply unit 290 included in the wireless power reception apparatus 200 will be described with reference to FIG. 6(b). As described above, the power supply unit 290 may include the reception coil (Rx coil) 2911b and the resonance circuit 2912.

Besides, the power reception unit 291 of the power supply unit 290 may further include a rectifying circuit 2913 that converts an AC current generated by the resonance phenomenon into a DC current. The rectifying circuit 2913 may be configured to be the same as described above.

The power reception unit 291 may further include a power sensing unit 2914 for monitoring a voltage and/or a current of rectified power. The power sensing unit 2914 may be configured to be the same as described above.

Electronic Devices Having Mutual Wireless Charging Function According to Embodiment Hereinafter, an example of a wireless power transmission apparatus implemented in the form of an electronic device having a wireless charging function between devices such that it is operated according to embodiments disclosed in the present disclosure will be described.

Figure 7:
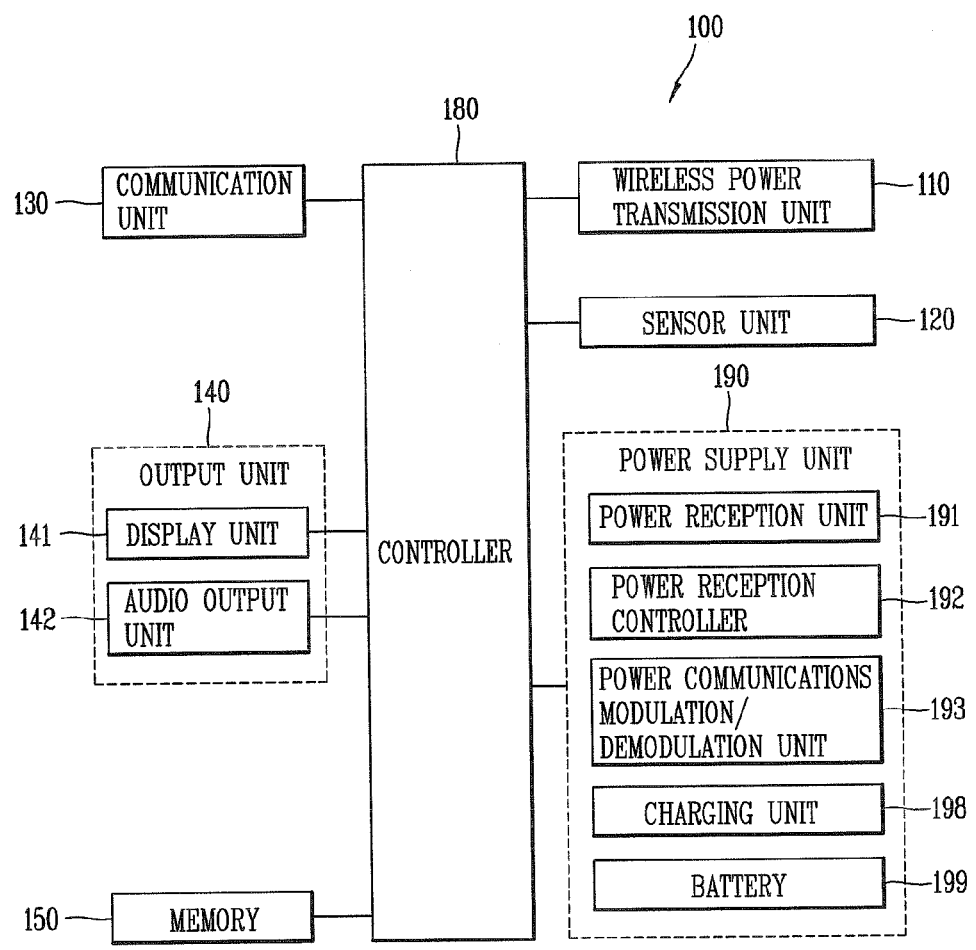
FIG. 7 is a block diagram of the wireless power transmission apparatus including further components in addition to the components illustrated in FIG. 2(a)

FIG. 7 is a block diagram of the wireless power transmission apparatus including further components in addition to the components illustrated in FIG. 2(a).

As can be seen with reference to FIG. 7, the wireless power transmission apparatus 100 may further include a sensor unit 120, a communication unit 130, an output unit 140, a memory 150 and a controller 180, in addition to the power transmission unit 110 and the power supply unit 190 supporting one or more of inductive coupling and electromagnetic resonance coupling.

The controller 180 controls the power transmission unit 110, the sensor unit 120, the communication unit 130, the output unit 140, the memory 150, and the power supply unit 190.

The controller 180 may be implemented as a module separated from the power transmission controller 112 in the power transmission unit 110 described above with reference to FIG. 2 or may be implemented as a single module.

The sensor unit 120 may include a sensor for sensing the position of the wireless power reception apparatus 200. Information regarding the position sensed by the sensor unit 120 may be used for the power transmission unit 110 to efficiently transfer power.

For example, in the wireless power transmission according to the embodiments supporting inductive coupling, the sensor unit 120 may operate as a position detection unit. The information regarding the position sensed by the sensor unit 120 may be used to move or rotate the transmission coil 1111a in the power conversion unit 111.

Also, for example, the wireless power transmission apparatus 100 according to the embodiments configured to include one or more transmission coils described above may determine coils, among the one or more transmission coils, which is to be in an inductive coupling relationship or electromagnetic resonance coupling relationship with the reception coil of the wireless power reception apparatus, based on the position information of the wireless power reception apparatus 200.

Meanwhile, the sensor unit 120 may be configured to monitor whether or not the wireless power reception apparatus 200 approaches or accesses a charging available area. The function of sensing an access to the charging available area by the sensor unit 120 may be executed separately from or in association with the function of sensing an access of the wireless power reception apparatus 200 by the power transmission controller 112 of the power transmission unit 110.

The communication unit 130 performs wired/wireless data communication with the wireless power reception apparatus 200. The communication unit 130 may include electronic components for any one or more of Bluetooth™, ZigBee, ultra wide band (UWB), wireless USB, near field communication (NFC) and wireless LAN.

The output unit 140 includes at least one of a display unit 141 and an audio output unit 142. The display unit 141 may include at least one of a liquid crystal display (LCD), a thin film transistor-liquid crystal display (TFT LCD), an organic light-emitting diode (OLED), a flexible display, and a 3D display. The display unit 141 may display a charging state under a control of the controller 180.

The memory 150 may include a storage medium of at least one of a flash memory type, a hard disk type, a multimedia card micro type, a card type memory (e.g., an SD or XD memory, and the like.), a random access memory (RAM), a static random access memory (SRAM), a read-only memory (ROM), an electrically erasable programmable read-only memory (EEPROM), a programmable read-only memory (PROM), a magnetic memory, a magnetic disk and an optic disk. The wireless power transmission apparatus 100 may operate in relation to a Web storage performing a storage function of the memory 150 on the Internet. Programs or commands executing the aforementioned functions of the wireless power transmission apparatus 100 may be stored in the memory 150. The controller 180 may execute the programs or commands stored in the memory 150 so as to wirelessly transmit power. A memory controller (not shown) may be used for the other components (e.g., the controller 180) included in the wireless power transmission apparatus 100 to access the memory 150.

It will be readily understood by those skilled in the art that the configuration of the wireless power transmission apparatus according to the embodiments disclosed in the present disclosure may be applied to devices such as a docking station, a terminal cradle device, and any other electronic devices, except for the case of being applicable to only the wireless charger.

Meanwhile, the power supply unit 190 supplies power for the power conversion unit 111 to form a wireless power signal. The power supply unit 190 may include a battery 199, and may include modules (e.g., a power reception unit 191, a power reception controller 192, power communications modulation/demodulation unit 193, and the like) for receiving wireless power transmitted from a different wireless power transmission apparatus and a charging unit 198 for charging a battery 199. For the same elements, among the elements of the power supply unit 190 of the wireless power transmission apparatus 100, as those of a power supply unit 290 of the wireless power reception apparatus to be described hereinafter, a description of the elements with reference to FIG. 8 will be used.

Meanwhile, the wireless power transmission apparatus according to the embodiments for mutual wireless power transmission disclosed in the present disclosure may be implemented in the form of an electronic device 100 which receives wireless power from a different wireless power transmission apparatus (a first apparatus) and transmits wireless power to a wireless power reception apparatus (a second apparatus) based on the wireless power received from the first apparatus.

The electronic device 100 may be implemented to include the power reception unit 191 for receiving a first wireless power signal formed by the first apparatus, the power conversion unit 111 for forming a second wireless power signal for transferring power to the second apparatus by using power obtained based on the first wireless power signal and receiving a second wireless power signal modulated by the second apparatus, the communication unit 130 for transmitting and receiving user data through a connection to the second apparatus, and the controllers 112, 180, and 192 for receiving access information through the modulated second wireless power signal and establishing the connection with the second apparatus based on the access information.

Meanwhile, the wireless power transmission apparatus according to the embodiments for mutual wireless power transmission disclosed in the present disclosure may also be implemented in the form of an electronic device 100 which receives wireless power from a different wireless power transmission apparatus (a first apparatus), charges a battery based on the received wireless power signal, and transmits wireless power to a wireless power reception apparatus (a second apparatus).

The electronic device 100 may be implemented to include a main body having the battery 199, the power reception unit 191 for receiving a first wireless power signal formed by the first apparatus, the charging unit 198 for charging the battery 199 based on the received first wireless power signal, the power conversion unit 111 for forming the second wireless power signal to transfer power to the second apparatus, and the controllers 112, 180, and 192 for determining whether to activate a power reception function or a power transmission function.

When the power reception function is activated, the controllers 112, 180, and 192 may control the power reception unit 191 to receive the first wireless power signal, and when the power transmission function is activated, the controllers 112, 180, and 192 may control the power conversion unit 111 to form the second wireless power signal.

The controllers 112, 180, and 192 may activate the power transmission function based on the transmission request message. Here, the power control message may be a transmission request message of the second wireless power signal.

Wireless Power Reception Apparatus Implemented as Mobile Terminal

Figure 8:
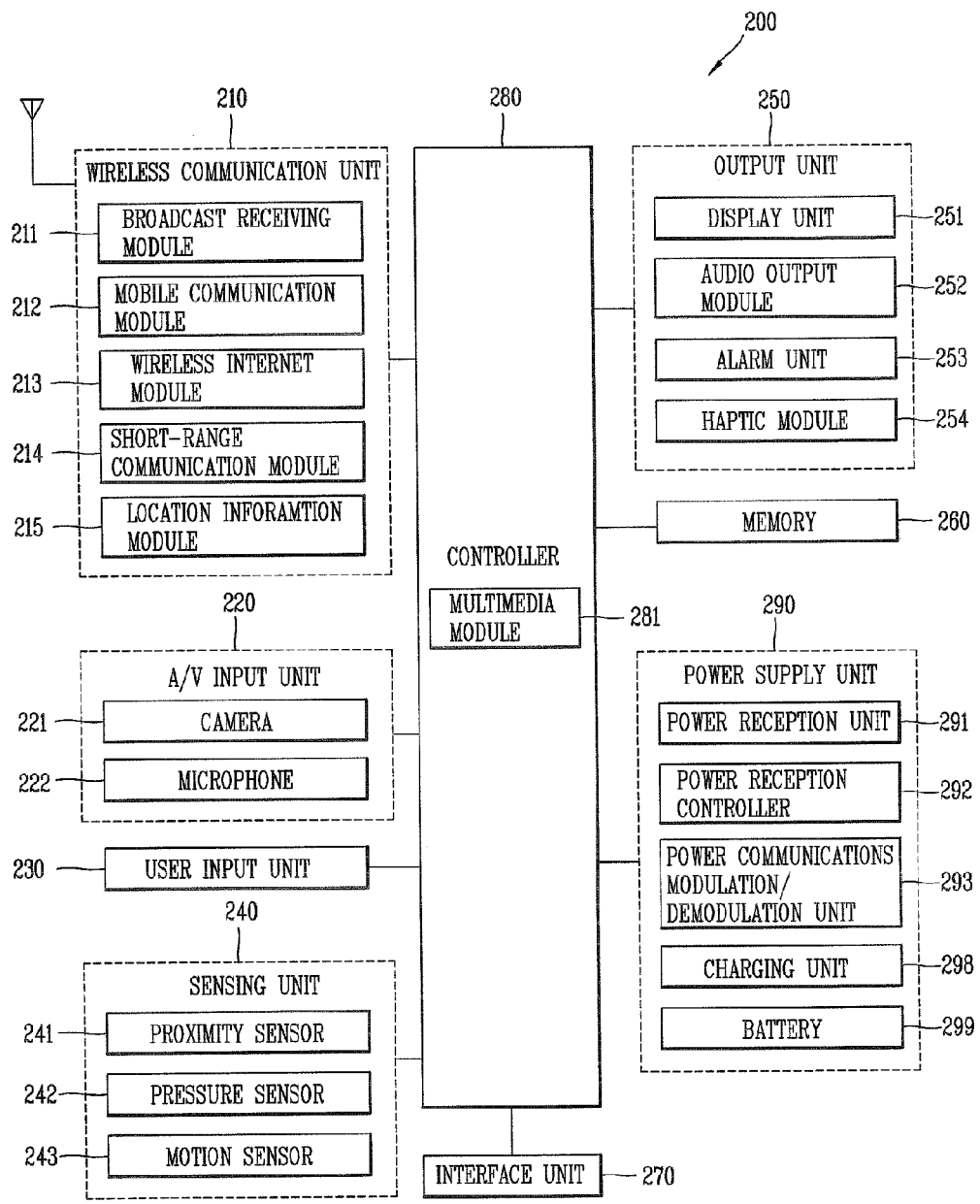
FIG. 8 is a block diagram illustrating a configuration of the wireless power reception apparatus 200 implemented in the form of a mobile terminal according to embodiments of the present disclosure.

FIG. 8 is a block diagram illustrating a configuration of the wireless power reception apparatus 200 implemented in the form of a mobile terminal according to embodiments of the present disclosure.

The mobile terminal 200 includes the power supply unit 290 shown in FIG. 2, 4 or 6.

The mobile terminal 200 may further include a wireless communication unit 210, audio/video (A/V) input unit 220, a user input unit 230, a sensing unit 240, an output unit 250, a memory 260, an interface unit 270 and a controller 280. The components shown in FIG. 10 are not essential, and therefore, the mobile terminal may be implemented to have a larger number of components or to have a smaller number of components.

Hereinafter, the components will be sequentially described.

The wireless communication unit 210 may include one or more modules that enable wireless communication between the mobile terminal 200 and a wireless communication system, between the mobile terminal 200 and a network in which the mobile terminal 200 is placed, or between the mobile terminal 200 and the wireless power transmission apparatus 100. For example, the wireless communication unit 210 may include a broadcast receiving module 211, a mobile communication module 212, a wireless Internet module 213, a short range communication module 214, a location information module 215, and the like.

The broadcast receiving module 211 receives a broadcasting signal and/or broadcasting related information from an external broadcasting center through a broadcasting channel.

The broadcasting channel may include a satellite channel and a terrestrial channel. The broadcasting center may mean a server that generates a broadcasting signal and/or broadcasting related information and transfers the generated broadcasting signal and/or broadcasting related information to the mobile terminal or a server that receives a previously generated broadcasting signal and/or broadcasting related information and transfer the received broadcasting signal and/or broadcasting related information to the mobile terminal. The broadcasting signal may include not only a TV broadcasting signal, a radio broadcasting signal and a data broadcasting signal but also a broadcasting signal obtained by combining the data broadcasting signal with the TV broadcasting signal or radio broadcasting signal.

The broadcasting related information may mean information related to a broadcasting channel, broadcasting program or broadcasting service provider. The broadcasting related information may be provided through a mobile communication network. In this case, the broadcasting related information may be received by the mobile communication module 212.

The broadcasting related information may exist in various forms. For example, the broadcasting related information may exist in the form of an electronic program guide (EPG) of digital multimedia broadcasting (DMB), electronic service guide (ESG) of digital broadcast-handheld (DVB-H), and the like.

The broadcast receiving module 211 may receive a digital broadcasting signal, for example, using a digital broadcasting system such as digital multimedia broadcasting-terrestrial (DMB-T), digital multimedia broadcasting-satellite (DMB-S), media forward link only (MediaFLO), digital video broadcasting-handheld (DVB-H) or integrated service digital broadcast-terrestrial (ISDB-T). It will be apparent that the broadcast receiving module 211 may be configured to be suitable for not only the digital broadcasting system but also another broadcasting system.

The broadcasting signal and/or the broadcasting related information received through the broadcast receiving module 211 may be stored in the memory 260.

The mobile communication module 212 transmits/receives a wireless signal with at least one of a base station, an external terminal and a server on the mobile communication network. The wireless signal may include a voice call signal, a video call signal and various types of data according to character/multimedia message transmission/reception.

The wireless Internet module 213 refers to a module for wireless Internet access, and may be built in the mobile terminal 200 or mounted to the outside of the mobile terminal 200. The wireless Internet access may include wireless LAN (Wi-Fi), wireless broadband (Wibro), world interoperability for microwave access (Wimax), high speed downlink packet access (HSDPA), and the like.

The short range communication module 214 refers to a module for short range communication. The wireless short range communication may include Bluetooth, radio frequency identification (RFID), infrared data association (IrDA), ZigBee, and the like. Meanwhile, the wired short range communication may include universal serial bus (USB), IEEE 1394, Thunderbolt™, and the like.

The wireless Internet module 213 or the short range communication module 214 may establish data communication connection with the wireless power transmission apparatus 100.

When there is an audio signal to be output while wirelessly transmitting power through the established data communication, the wireless Internet module 213 or the short range communication module 214 may transfer the audio signal to the wireless power transmission apparatus 100 through the short range communication module. When there is information to be displayed through the established data communication, the wireless Internet module 213 or the short range communication module 214 may transfer the information to the wireless power transmission apparatus 100. Alternatively, the wireless Internet module 213 or the short range communication module 214 may receive an audio signal input through a microphone built in the wireless power transmission apparatus 100 through the established data communication. The wireless Internet module 213 or the short range communication module 214 may transfer identification information (e.g., a phone number or device name in a cellular phone) of the mobile terminal 200 to the wireless power transmission apparatus 100 through the established data communication.

The location information module 215 is a module for obtaining the position of the mobile terminal, and a global positioning system (GPS) module may be used as an example of the location information module 215.

Referring to FIG. 8, the A/V input unit 220 is used to input an audio or video signal, and may include a camera 221, a microphone 222, and the like. The camera 221 processes an image frame such as a still image or moving image obtained by an image sensor in a video call mode or photographing mode. The processed image frame may be displayed in the display unit 251.

The image frame processed in the camera 221 may be stored in the memory 260 or may be transferred to the outside through the wireless communication unit 210. The camera 221 may be provided with two or more cameras according to the environment used.

The microphone 222 receives an external audio signal in a call mode, recording mode, voice recognition mode, and the like, and processes the received audio signal as voice data. The processed voice data may be converted and output to be transferred to a mobile communication station through the mobile communication module 212 in the call mode. Various noise removing algorithms for removing noise generated in the process of receiving an external audio signal may be implemented in the microphone 222.

The user input unit 230 generates input data for controlling the operation of a user terminal. The user input unit 230 may be configured as a key pad, dome switch, touch pad (static voltage/static current), a jog wheel, jog switch, and the like.

The sensing unit 240 may include a proximity sensor 241, a pressure sensor, a motion sensor 243, and the like. The proximity sensor 241 may detect, without any mechanical contact, an object approaching the mobile terminal 200, an object present in the vicinity of the mobile terminal 200, and the like. The proximity sensor 241 may detect an object approaching the mobile terminal 200 using a change in AC magnetic field or static magnetic field, a change in capacitance, and the like. The proximity sensor 241 may be provided with two or more proximity sensors according to the environment used.

The pressure sensor 242 may detect whether or not or not pressure is applied to the mobile terminal 200, the strength of the pressure, and the like. The pressure sensor 242 may be mounted at a portion required for detection of pressure in the mobile terminal 200 according to the environment used. If the pressure sensor 242 is mounted in the display unit 251, the pressure sensor 242 may identify a touch input through the display unit 251 and a pressure touch input of which pressure is greater than that of the touch input, according to the signal output from the pressure sensor 242. The pressure sensor 242 may detect the strength of the pressure applied to the display unit 251 when a pressure touch is input, according to the signal output from the pressure sensor 242.

The motion sensor 243 senses a position or motion of the mobile terminal 200 using an acceleration sensor, gyro sensor, and the like. The acceleration sensor used for the motion sensor 243 is an element that changes a change in acceleration in any one direction into an electrical signal. The acceleration sensor is generally configured by mounting two or three axes in one package, and may require only one axis, i.e., the Z-axis according to the environment used. Therefore, when an acceleration sensor in the direction of the X- or Y-axis is used other than that in the direction of the Z-axis, the acceleration sensor may be mounted vertically to a main board using a separate piece of board. The gyro sensor is a sensor that measures an angular speed of the mobile terminal 200 performing a rotary motion, and may sense an angle at which the mobile terminal 200 is rotated with respect to each reference direction. For example, the gyro sensor may sense rotational angles, i.e., an azimuth, a pitch and a roll, with respect to the three directional axes.

The output unit 250 is used to generate an output related to a visual sense, auditory sense, a haptic sense, and the like. The output unit 250 may include a display unit 251, an audio output module 252, an alarm unit 253, a haptic module 254, and the like.

The display unit 251 displays (outputs) information processed in the mobile terminal 200. For example, when the mobile terminal 200 is in a call mode, the display unit 251 displays a user interface (UI) or graphic user interface (GUI) related to a call. When the mobile terminal 200 is in a video call mode or photographing mode, the display unit 251 displays a photographed or/and received image, UI or GUI.

The display unit 251 may include at least one of an LCD, a TFT LCD, an OLED, a flexible display and a 3D display.

Some of these displays may be configured as transparent or light-transmissive displays through which a user can see an outside view. These displays may be called as transparent displays, and transparent OLED (TOLED), and the like, may be used as a representative of the transparent displays. The rear structure of the display unit 251 may also be configured as a light-transmissive structure. Through such a structure, the user can see an object positioned at the rear of the mobile terminal 200 through an area occupied by the display unit 251 of the mobile terminal 200.

Two or more display units 251 may exist according to the implemented form of the mobile terminal 200. For example, a plurality of display units may be spaced apart or integrally displaced on one surface, or may be displaced on different surfaces, respectively.

When the display unit 251 and a sensor sensing a touch operation (hereinafter, referred to as a 'touch sensor') form an inter-layer structure (hereinafter, referred to as a 'touch screen'), the display unit 251 may be used as an input device as well as an output device. The touch sensor may have, for example, the form of a touch film, touch sheet, touch pad, and the like.

The touch sensor may be configured to convert a change in pressure applied to a particular portion of the display unit 251 or capacitance generated at a particular portion of the display unit 251 into an electrical input signal. The touch sensor may be configured to detect not only the position and area of a touched portion but also the pressure at the touched portion.

When there is a touch input for the touch sensor, a signal(s) corresponding to the touch input is sent to a touch controller. The touch controller processes the signal(s) and then transfers corresponding data to the controller 280. Accordingly, the controller 280 can determine which area of the display unit 251 is touched, and the like.

The proximity sensor 241 may be placed in an internal area of the mobile terminal surrounded by the touch screen or in the proximity of the touch screen. The proximity sensor 241 refers to a sensor that senses, without any mechanical contact, an object approaching a predetermined detection surface or the presence or absence of an object present near the predetermined detection surface using an electromagnetic force or infrared ray.

For example, the proximity sensor 241 includes a transmissive photoelectric sensor, a mirror reflective photoelectric sensor, a high-frequency oscillation proximity sensor, a capacitive proximity sensor, a magnetic proximity sensor, an infrared proximity sensor, and the like. When the touch screen is a capacitive touch screen, the touch screen is configured to detect the proximity of a pointer through a change in electric field according the proximity of the pointer. In this case, the touch screen (touch sensor) may be classified as the proximity sensor.

Hereinafter, for convenience of illustration, the action that the pointer comes close to the touch screen while not being contacted on the touch screen so as to be recognized that the pointer is placed on the touch screen is referred to as a "proximity touch," and the action that the pointer is substantially contacted on the touch screen is referred to as a "contact touch." The position at which the pointer is proximately touched on the touch screen means a position at which when the pointer is proximately touched, the pointer corresponds vertically to the touch screen.

The proximity sensor 241 senses a proximity touch action and a proximity touch pattern (e.g., a proximity touch distance, proximity touch direction, proximity touch speed, a proximity touch time, proximity touch position, proximity touch movement state, and the like). Information corresponding to the sensed proximity touch action and proximity touch pattern may be output on the touch screen.

The audio output module 252 may receive a call signal from the wireless communication unit 210 in a call or recoding mode, voice recognition mode, broadcast receiving mode, and the like, and may output the audio data stored in the memory 260. The audio output module 252 may output an audio signal related to a function (e.g., a call signal receiving sound, message receiving sound, and the like.) performed by the mobile terminal 200. The audio output module 252 may include a receiver, a speaker, a buzzer, and the like.

The alarm unit 253 outputs a signal for informing that an event occurs in the mobile terminal 200. The event occurring in the mobile terminal 200 includes, for example, call signal reception, message reception, key signal input, touch input, and the like. The alarm unit 253 may output, for example, a signal for informing the occurrence of an event through vibration, as well as a video or audio signal. Since the video or audio signal may be output through the display unit 251 or the audio output module 252, the display unit 251 and the audio output module 252 may be classified as a portion of the alarm unit 253.

The haptic module 254 generates various haptic effects that a user can feel. A vibration is used as a representative of the haptic effects generated by the haptic module 254. The intensity and pattern of the vibration generated by the haptic module 254 may be controlled. For example, different vibrations may be synthesized and output or may be sequentially output.

In addition to the vibration, the haptic module 254 may generate various haptic effects including an effect caused by the arrangement of pins performing a vertical movement on a contact skin surface, an effect caused by the jet force or absorption force of air through an absorption port, an effect caused by the graze through a skin surface, an effect caused by the contact of an electrode, an effect caused by a stimulus such as an electrostatic force, an effect caused by the reproduction of a cool and warm feeling using an element for heat absorption or generation, and the like.

The haptic module 254 may be implemented not only to provide a user with a haptic effect through a direct contact but also to allow the user to feel a haptic effect through a muscle sense using a finger, arm, and the like. The haptic module 254 may be provided with two or more haptic modules according to the environment used.

The memory 260 may store a program for operations of the controller 280, and may temporarily store input/output data (e.g., a phone book, a message, a still image, a video, and the like). The memory 260 may store data for vibration and sound of various patterns, which are output when a touch is input on the touch screen.

In some embodiments, the memory 260 may store software components including an operating system (not shown), a module performing the function of wireless communication unit 210, a module operating together with the user input unit 230, a module operating together with the A/V input unit 220 and a module operating together with the output module 250. The operating system (e.g., LINUX, UNIX, OS X, WINDOWS, Chrome, Symbian, iOS, Android, VxWorks or another embedded operating system) may include various software components and/or drivers for controlling system tasks such as memory management and power management.

The memory 260 may store a configuration program related to wireless power transfer or wireless charging. The configuration program may be executed by the controller 280.

The memory 260 may store an application related to the wireless power transfer (or wireless charging) downloaded from an application providing server (e.g., an App store). The application related to the wireless power transfer is a program for controlling the wireless power transfer. The wireless power reception apparatus 200 may wirelessly receive power from the wireless power transmission apparatus 100 through the corresponding program or may establish connection for data communication with the wireless power transmission apparatus 100.

The memory 260 may include a storage medium of at least one of a flash memory type, a hard disk type, a multimedia card micro type, a card type memory (e.g., an SD or XD memory, and the like), a RAM, an SRAM, a ROM, an EEPROM, a PROM, a magnetic memory, a magnetic disk and an optic disk. The mobile terminal 200 may operate in relation to a web storage performing a storage function of the memory 260 on the Internet.

The interface unit 270 serves as a gateway to all external devices connected to the mobile terminal 200. The interface unit 270 may receive data from an external device, may receive power and provide the received power to each of the components in the mobile terminal 200, or may allow data in the mobile terminal 200 to be transmitted to the external device. For example, the interface unit 270 may include a wired/wireless headset port, an external charger port, a wired/wireless data port, a memory card port, a port for connecting an apparatus provided with an identification module, an audio input/output (I/O) port, a video I/O port, an earphone port, and the like.

The identification module is a chip in which various information for authenticating the use right of the mobile terminal 200, and may include a user identify module (UIM), a subscriber identity module (SIM), a universal subscriber identity module USIM, and the like. The apparatus provided with the identification module (hereinafter, referred to as an 'identification apparatus') may be manufactured in the form of a smart card. Therefore, the identification apparatus may be connected to the mobile terminal 200 through a port.

When the mobile terminal 200 is connected to an external cradle, the interface unit 270 may become a path along which power is supplied from the cradle to the mobile terminal 200, or may become a path along which various command signals input from the cradle are provided to the mobile terminal 200. The power or various command signals input from the cradle may be operated as a signal for recognizing that the mobile terminal 200 has been exactly mounted to the cradle.

The controller 280 generally controls overall operations of the mobile terminal 200. For example, the controller 280 performs relative control and processing for voice conversation, data communication, video conversation, and the like. The controller 280 may have a multimedia module 281 for multimedia reproduction. The multimedia module 281 may be implemented in the controller 280 or may be implemented separately from the controller 280. The controller 280 may be implemented as a module separate from the power reception controller 292 in the power supply unit 290 described with reference to FIG. 2, or may be implemented as a single module.

The controller 280 may perform pattern recognition processing so that a writing or drawing input performed on the touch screen can be recognized as a character or image.

The controller 280 performs a wired or wireless charging operation according to a user input or internal input. The internal input is a signal for informing that inductive current generated in the secondary coil of the mobile terminal has been sensed.

As described above, the power reception controller 292 in the power supply unit 290 may be implemented in the state in which the power reception controller 292 is included in the controller 280. In this specification, it will be understood that the operation of the power reception controller 292 is performed by the controller 280.

The power supply unit 290 receives external power and/or internal power under a control of the controller 280 so as to supply power required for the operation of each of the components.

The power supply unit 290 has a battery 299 supplying power to each of the components in the mobile terminal 200. The power supply unit 290 may include a charging unit 298 for charging the battery 299 by a wireline or wirelessly.

Meanwhile, the terminal device 200 according to embodiments disclosed in the present disclosure may include a power reception unit 291 for receiving a wireless power signal for a power transmission from a power transmission apparatus and modulates the received wireless power signal to include a power control message, a communication unit 210 for transmitting and receiving user data through a connection to the power transmission apparatus, and controllers 280 and 292 for providing control to transmit the power control message for requesting a transmission of the wireless power signal to the power transmission apparatus, transmit a control message including access information for establishing the connection to the power transmission apparatus, establish the connection based on the access information, and transmit screen data or event information to the power transmission apparatus through the communication unit.

Also, the terminal device 200 may be implemented to further include the charging unit 298 for charging the battery 299. The controllers 280 and 292 may be configured to control the charging unit 298 to charge the battery 299 based on the received wireless power signal.

The present disclosure has disclosed the mobile terminal as the wireless power receiving apparatus. However, it can be readily understood by those skilled in the art that the configuration according to the embodiments of the present disclosure may be applied to a fixed terminal such as a digital TV or desktop computer, except a case in which the configuration according to the embodiments of the present disclosure is applicable to only the mobile terminal.

Various Embodiments

Figure 9:
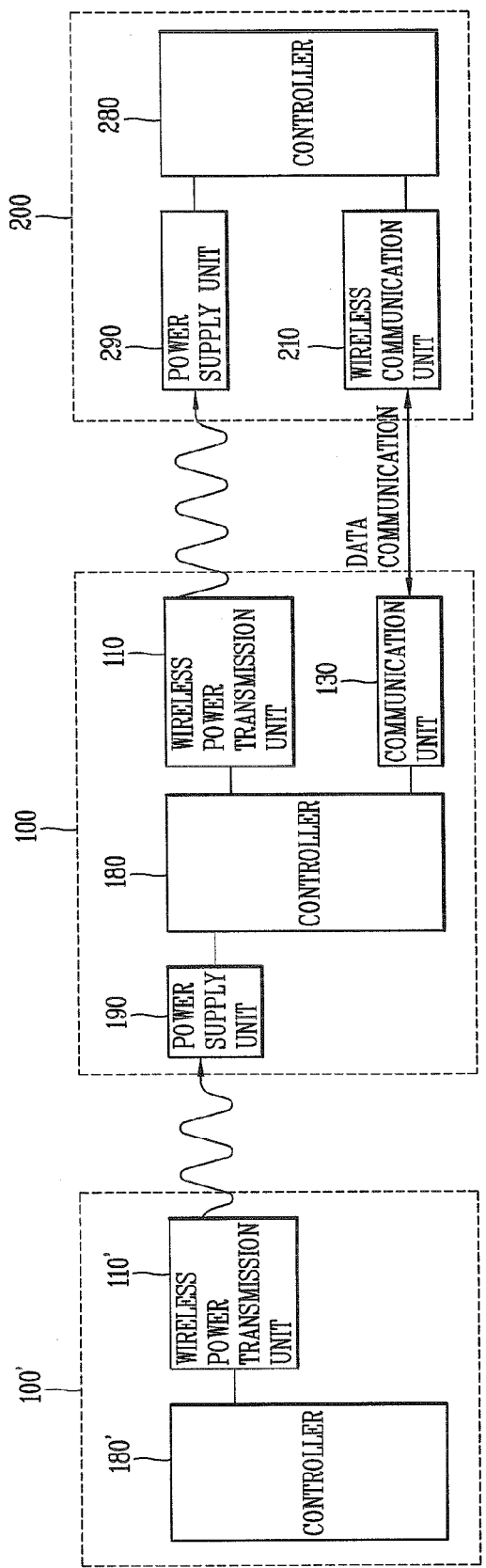
FIG. 9 illustrates a method of operating the wireless power transmission apparatus and the wireless power reception apparatus according to embodiments of the present disclosure.

FIG. 9 illustrates a method of operating the wireless power transmission apparatus and the wireless power reception apparatus according to embodiments of the present disclosure.

With reference to FIG. 9, the electronic device 100 performing a mutual wireless power transmission disclosed in the present disclosure performs a function of wirelessly transferring power to the wireless power reception apparatus 200 and a function of wirelessly receiving power from a different wireless power transmission apparatus 100'. Namely, the electronic device 100 is implemented in the form of the electronic device 100 which receives wireless power from the different wireless power transmission (a first apparatus) 100', charges the battery based on the received wireless power signal, and transmits wireless power to the wireless power reception apparatus (a second apparatus) 200.

In this manner, the electronic device 100 may be configured to include the power supply unit 190. The power supply unit 190 may include a main body having the battery 199, the power reception unit 191 for receiving the first wireless power signal formed by the first apparatus 100', and the charging unit 198 for charging the battery 199 based on the received first wireless power signal.

In this case, the electronic device 100 may use power of the battery 199 to form the second wireless power signal, but it also does not exclude the use of power received through the first wireless power signal.

In order to perform mutual wireless power transmission, the electronic device 100 may perform the function of wirelessly transferring power to the wireless power reception apparatus 200 and the function of wirelessly receiving power from the different wireless power transmission apparatus 100', by using a shared coil or antenna. Namely, the power reception unit 191 and the power conversion unit 111 may share a coil or an antenna in order to transmit and receive wireless power.

Also, the electronic device 100 may be implemented to include the power conversion unit 111 for forming the second wireless power signal to transfer power to the second apparatus by using power of the battery 199 and the controller 180 for determining whether to activate the power reception function or the power transmission function. Meanwhile, the controller 180 may be integrated with the power transmission controller 112 of the wireless power transmission unit 110 or with the power reception controller 192 of the power supply unit 190.

As can be seen with reference to FIG. 9, the electronic device 100 may further include a communication unit 130 for transmitting and receiving user data through a connection to the second apparatus 200.

In some embodiments, when the power transmission function with respect to the second apparatus 200 is activated, the controller 180 may control the communication unit 130 to transmit and receive user data through the connection. In particular, when the electronic device 100 cannot be directly connected to the Internet, an external network, or a common network so it cannot transmit or receive data, the electronic device 100 may transmit and receive data to and from the outside through a connection established with the second apparatus 200. In this case, the electronic device 100 may use communication resource of the second apparatus 200 for communication with the outside and operate to provide wireless power in reward.

Meanwhile, in some embodiments, the electronic device 100 may activate or deactivate the wireless power transmission function and the wireless power reception function. When the power reception function is activated, the controller 180 may control the power reception unit 191 to receive the first wireless power signal, and when the power transmission function is activated, the controller 180 may control the power conversion unit 111 to form the second wireless power signal.

In this case, the controller may activate the wireless power transmission function based on a transmission request message. The transmission request message may be received from the second apparatus 200. Here, the transmission request message may be a transmission request message of the second wireless power signal and may be received in the form of a power control message from the second apparatus 200.

The power control message may be transferred through the second wireless power signal modulated by the second apparatus 200 or may be transferred through user data by the communication unit 130. In such a case, the power conversion unit 111 may receive the second wireless power signal modulated by the second apparatus 200, and here, the power control message may be a message received through the modulated second wireless power signal.

When the power transmission function is activated by the power transmission request message, the controller 180 may form the second wireless power signal and transmit wireless power to the second apparatus 200.

Thus, the second apparatus 200 corresponding to the wireless power reception apparatus may check a power state thereof and transmit the power transmission request message to the electronic device 100 based on the checked power state.

The electronic device 100 may process the transmission request message in consideration of remaining power capacity of the battery 199. Namely, when the remaining capacity of the battery 199 is less than a certain level, the electronic device 100 may disregard the transmission request message of inform the second apparatus 200 that power transmission is impossible, without activating the wireless power transmission function.

Meanwhile, the controller 180 may control the communication unit 130 to establish a connection with the second apparatus 200 based on the access information received from the second apparatus 200. The access information may be an address of the second apparatus, authentication information, device identification information, or control information for a relay service.

In an embodiment, the access information may be information for authentication or authorization for data communication.

For example, the communication unit 130 may perform communication according to a Bluetooth scheme and the access information may be a password or an address. Also, the controller 180 may establish a communication for data communication by performing device pairing with the second apparatus 200 based on the Bluetooth address.

For example, the communication unit 130 may perform communication according to a WLAN scheme and the access information may be a password, a key, or an address required for a WLAN access. Also, the controller 180 may establish a connection for data communication by performing authentication with the second apparatus based on the access information.

Communication according to the WLAN scheme may be performed in an infrastructure mode or an ad-hoc mode. Thus, in an embodiment, the second apparatus 200 may operate in the form of an access point (AP) for performing a connection to an external network. In this case, the electronic device 100 may use network resources through a WLAN from the second apparatus 200, and may operate to provide wireless power in reward.

In an embodiment, similar to the case of WLAN, the electronic device 100 may transmit and receive data to and from the second apparatus 200 through the communication unit 130 in a tethering manner. In this case, the access information may be control information for tethering.

The access information may be transferred through a wireless power signal. Namely, the access information may be included in the power control message received by the power conversion unit 111 and thus received.

Meanwhile, the electronic device 100 may operate as a device relaying wireless power received from the first apparatus 100' to the second apparatus 200. In detail, since a limitation of a distance for transferring power based on the first wireless power signal differs according to a wireless power transfer method (e.g., electromagnetic inductive coupling or magnetic resonance coupling) supported by the first apparatus 100', the electronic device 100 may serve to relay a wireless power signal for both apparatuses 100' and 200.

In this case, the electronic device 100 may change the wireless power transfer scheme to relay the wireless power signal. Namely, the electronic device 100 may receive the wireless power signal according to a magnetic induction scheme available for a relatively near field wireless power transmission from the first apparatus 100' and perform a relatively remote wireless power transmission according to magnetic resonance scheme.

Meanwhile, as shown in FIG. 7, the electronic device 100 may further include the display unit 141. In this case, the controller 180 may control the display unit 141 to display the user data of the second apparatus 200, which has been received by the communication unit 130.

In some embodiments, the user data may be screen data of the second apparatus 200. Namely, when the second apparatus 200 is implemented to have the display unit 251, data with respect to a screen to be displayed on the display unit 251 of the second apparatus 200 may be transmitted to the electronic device 100 through the connection, and the controller 180 may display the received screen data on the display unit 141. When the screen of the display unit 251 of the second apparatus is not viewed to a user, for example, when the second apparatus 200 is disposed such that the display unit 251 thereof faces the bottom, the second apparatus 200 may transmit the screen data so as to be displayed on the display unit 141 of the electronic device 100.

In some embodiments, the user data may be information regarding an event occurring in the second apparatus 200. For example, in case in which the second apparatus 200 is a mobile terminal, when an event occurs such that there is data such as received characters, or the like, there is a change in a wireless power transmission state, charging state, or the like, the mobile terminal may transmit information regarding the generated event so as to be displayed on the display unit 141 of the electronic device 100.

The methods described above may be implemented in a recording medium readable by a computer or a device similar to the computer by using software, hardware or a combination thereof.

According to a hardware implementation, the methods described above may be implemented by using at least one of application specific integrated circuits (ASICs), digital signal processors (DSPs), digital signal processing devices (DSPDs), programmable logic devices (PLDs), field programmable gate arrays (FPGAs), processors, controllers, and electrical units for performing any other functions. For example, the methods may be implemented by the controller 180 or the power transmission controller 112 of the electronic device 100 or may be implemented by the controller 180 280 or the power reception controller 292 of the wireless power reception apparatus 200.

According to a software implementation, the embodiments such as procedures and functions described in the present disclosure may be implemented with separate software modules. Each of the software modules may perform one or more functions and operations described in the present disclosure. Software codes may be implemented by a software application written by an appropriate programming language. The software codes may be stored in the memory 150 of the electronic device 100, and may be executed by the controller 180 or the power transmission controller 112. Also, similarly, the software codes may be stored in the memory 260 of the wireless power reception apparatus 200 and executed by the controller 280 or the power reception controller 292.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and thus all changes and modifications that fall within the metes and bounds of the claims, or equivalents of such metes and bounds are thus intended to be embraced by the appended claims.

What is claimed is:

1. An electronic device comprising:
a battery;
a power reception unit configured to receive a first wireless power signal formed by a first apparatus;
a charging unit configured to charge the battery based on the received first wireless power signal;
a sensor unit configured to sense a position of a second apparatus and monitor whether or not the second apparatus accesses a charging available area;
a power conversion unit configured to form a second wireless power signal by using power of the battery and transmit the second wireless power signal to the second apparatus based on the sensed position of the second apparatus; and
a controller configured to determine whether to activate a power reception function or a power transmission function,
wherein when the power reception function is activated, the controller controls the power reception unit to receive the first wireless power signal,
wherein when the power transmission function is activated, the controller controls the power conversion unit to form the second wireless power signal, wherein the power conversion unit comprises:
- a primary coil configured to generate a varied magnetic field so as to induce a current to a secondary coil of the second apparatus according to inductive coupling;
- a transmission coil configured to form a magnetic field having a particular resonance frequency so as to generate a resonance phenomenon in the second apparatus according to electromagnetic resonance couplings; and
- a driving unit configured to move the primary coil such that a distance between a center of the primary coil and a center of the secondary coil fall within a certain range, or to rotate the primary coil such that the center of the primary coil and the center of the secondary coil overlap, based on the sensed position of the second apparatus, and wherein the power conversion unit transmits the second wireless power signal by using one or more of inductive coupling and electromagnetic coupling.

2. The electronic device of claim 1, wherein the controller receives a power control message from the second apparatus and determines whether to activate the power transmission function based on the received power control message.

3. The electronic device of claim 2, wherein the power control message is a transmission request message of the second wireless power signal, and the controller activates the power transmission function based on the transmission request message.

4. The electronic device of claim 2, wherein the power conversion unit receives a modulated version of the second wireless power signal from the second apparatus, and the power control message is received through the modulated version of the second wireless power signal.

5. The electronic device of claim 4, further comprising:
a communication unit configured to transmit and receive user data through a connection with the second apparatus,
wherein when the power transmission function with respect to the second apparatus is activated, the controller controls the communication unit to transmit and receive user data through the connection.

6. The electronic device of claim 5, wherein the controller establishes the connection with the second apparatus based on access information, and the access information is included in the power control message received by the power conversion unit so as to be received.

7. The electronic device of claim 6, wherein the access information is an address of the second apparatus, authentication information, device identification information, control information for a relay service, or control information for tethering.

8. The electronic device of claim 5, further comprising:
a display unit,
wherein the controller displays the user data of the second apparatus received through the communication unit on the display unit.

9. The electronic device of claim 8, wherein the user data is screen data of the second apparatus or information regarding an event which has occurred in the second apparatus.

10. The electronic device of claim 1, wherein the controller forms the second wireless power signal by using transmitted power based on the first wireless power signal.

11. An electronic device comprising:
a power reception unit configured to receive a first wireless power signal formed by a first apparatus;
a sensor unit configured to sense a position of a second apparatus and monitor whether or not the second apparatus accesses a charging available area;
a power conversion unit configured to form a second wireless power signal by using power obtained based on the first wireless power signal, transmit the second wireless power signal to the second apparatus based on the sensed position of the second apparatus, and receive a modulated version of the second wireless power signal from the second apparatus;
a communication unit configured to transmit and receive user data through a connection with the second apparatus; and
a controller configured to receive access information through the modulated version of the second wireless power signal and establish the connection with the second apparatus based on the access information,
wherein the power conversion unit comprises:
- a primary coil configured to generate a varied magnetic field so as to induce a current to a secondary coil of the second apparatus according to inductive coupling;
- a transmission coil configured to form a magnetic field having a particular resonance frequency so as to generate a resonance phenomenon in the second apparatus according to electromagnetic resonance couplings; and
- a driving unit configured to move the primary coil such that a distance between a center of the primary coil and a center of the secondary coil fall within a certain range, or to rotate the primary coil such that the center of the primary coil and the center of the secondary coil overlap, based on the sensed position of the second apparatus, wherein the power conversion unit transmits the second wireless power signal by using one or more of inductive coupling and electromagnetic coupling.

12. An electronic device comprising:
a sensor unit configured to sense a position of a power reception device and monitor whether or not the power reception device accesses a charging available area;
a power reception unit configured to receive a wireless power signal for transmitting power from a power transmission device and modulating the wireless power signal such that it includes a power control message;
a communication unit configured to transmit and receive user data through a connection with the power transmission device;
a controller configured to transmit a power control message for requesting a transmission of the wireless power signal to the power transmission device, transmit a control message including access information for establishing the connection to the power transmission device, establish the connection based on the access information, and transmit screen data or event information to the power transmission device through the communication unit;
a primary coil configured to generate a varied magnetic field so as to induce a current to a secondary coil of the power reception device according to inductive coupling;
a transmission coil configured to form a magnetic field having a particular resonance frequency so as to generate a resonance phenomenon in the power reception device according to electromagnetic resonance couplings; and
a driving unit configured to move the primary coil such that a distance between a center of the primary coil and a center of the secondary coil fall within a certain range, or to rotate the primary coil such that the center of the primary coil and the center of the secondary coil overlap, based on the sensed position of the power reception device, wherein the power reception unit receives the wireless power signal by using one or more of inductive coupling and electromagnetic coupling.

13. The electronic device of claim 12, further comprising:

a charging unit configured to charge a battery, wherein the controller controls the charging unit to charge the battery based on the received wireless power signal.

* * * * *